(12) United States Patent
Hong et al.

(10) Patent No.: US 8,986,760 B2
(45) Date of Patent: Mar. 24, 2015

(54) METHOD OF ENHANCING THE SHELF STABILITY OF PROBIOTICS

(75) Inventors: Liang Hong, Midland, MI (US); Kathy L. Lichtenwald, Midland, MI (US); Krishna Madduri, Westfield, IN (US); Syed A. Shah, Grand Blanc, MI (US); Christopher J. Tucker, Midland, MI (US); Caroline Woelfle, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 48 days.

(21) Appl. No.: 13/814,368

(22) PCT Filed: Sep. 6, 2011

(86) PCT No.: PCT/US2011/050514
§ 371 (c)(1),
(2), (4) Date: Feb. 5, 2013

(87) PCT Pub. No.: WO2012/027758
PCT Pub. Date: Mar. 1, 2012

(65) Prior Publication Data
US 2013/0142907 A1 Jun. 6, 2013

Related U.S. Application Data

(60) Provisional application No. 61/377,303, filed on Aug. 26, 2010.

(51) Int. Cl.
*A23L 1/00* (2006.01)
*A23L 1/30* (2006.01)
*A23L 2/52* (2006.01)

(52) U.S. Cl.
CPC ............... *A23L 1/0029* (2013.01); *A23L 1/30* (2013.01); *A23L 1/3014* (2013.01); *A23L 2/52* (2013.01)
USPC .......................................................... 426/61

(58) Field of Classification Search
CPC ............. A23V 2200/3204; A23V 2200/224; A23V 2200/22; A23V 2250/5026; A23V 2250/51082; A23L 1/3014; A23L 1/22016; A23L 1/3008; A23L 1/0032; A23L 1/3006; A23L 1/0061; A23L 1/0029; A61K 35/747; A61K 35/744; A61K 9/1652; A61K 9/2054; A61K 2300/00; A61K 8/11; A61K 35/741; A61K 9/0095; A61K 2035/128; A23K 1/004; A23K 1/164; A23K 1/1646; A23G 1/54; A23G 3/364; A23G 4/066; A01N 25/28; A01N 2300/00; A23D 7/06; A23P 1/04
USPC .................... 426/61, 98, 103, 5, 89, 96, 590; 424/93.45, 400, 93.1, 70.11, 484, 488, 424/93.44, 490
See application file for complete search history.

(56) References Cited

U.S. PATENT DOCUMENTS

| | | | |
|---|---|---|---|
| 5,698,246 A | * | 12/1997 | Villamar .......................... 426/54 |
| 2003/0194423 A1 | | 10/2003 | Torney et al. |
| 2005/0266069 A1 | | 12/2005 | Simmons et al. |
| 2006/0067984 A1 | | 3/2006 | Cavassini et al. |
| 2007/0065547 A1 | * | 3/2007 | Coyne et al. ................... 426/326 |
| 2008/0260893 A1 | | 10/2008 | Giffard et al. |
| 2009/0017163 A1 | | 1/2009 | Garbolino et al. |
| 2009/0041911 A1 | | 2/2009 | Gamay |

FOREIGN PATENT DOCUMENTS

| | | |
|---|---|---|
| CN | 1884513 A | 4/2010 |
| WO | 01/40758 A2 | 6/2001 |
| WO | 2008/035332 A1 | 3/2008 |

OTHER PUBLICATIONS

Raible, Antimicrobial Activity of the Esters of p-hydroxybenzoic Acid, Deutsche Fette, Seifen, Anstrichmittel, 61, pp. 667-669, 1959.
Streightoff, Inhibition of Bacteria by 5-fluoronicotinic Acid and Other Analogs of Nicotinic Acid, Journal of Bacteriology, 85(1), pp. 42-48, 1963.
Hodge, et al., New Antibacterial Mode of Action for Sulfonamides, Journal of Pharmaceutical Sciences, 61(1), pp. 142-143, 1972.
Dietrich, et al, The use of Triazine Inhibitors in Mapping the Active Site Region of *Lactobacillus casei* Dihydrofolate Reductase, Archives of Biochemistry and Biophysics, 194(2), pp. 612-619, 1979.
Gorina, et al., Effect of Fumaric Acid on the Growth of Lactic Acid Bacteria of Wine, Vinodelie i Vinogradarstvo SSSR, (4), p. 56, 1987.
Matsuoka, et al., Inhibitory Effect of Hexametaphosphate on the growth of *Staphylococcus aureus*, J. Food Hyg. Soc. Japan, 36 (5), pp. 588-594, 1995.
Arena, et al., Inhibition of Growth of *Lactobacillus plantarum* Isolated from Citrus Fruits in the Presence of Organic Acids, Microbiologie, Aliments, Nutrition, 14(3), pp. 219-226, 1996. Abstract only.
Fang, et al., Inhibition of *Staphylococcus aureus* and *Bacillus cereus* on a Vegetarian Food Treated with Nisin Combined with either Potassium Sorbate or Sodium Benzoate, Journal of Food Safety, 17(2), pp. 69-87, 1997.
Hashimoto, Antimicrobial Action of Chitosan Against Lactic Acid Bacteria Separated from Pickles. Nippon Shokuhin Kagaku Kogaku Kaishi, 45(6), pp. 368-374, 1998. Abstract only.
Thomas, et al., Synergist Effect of Sucrose Fatty Acid Esters on Nisin Inhibition of Gram-Positive Bacteria, Journal of Applied Microbiology, 85(6), pp. 1013-1022, 1998.

(Continued)

*Primary Examiner* — Hamid R Badr

(57) ABSTRACT

Described are methods of providing a shelf-stable probiotic-containing food or beverage, comprising forming a semi-permeable microsphere, said microsphere comprising a probiotic, a high molecular weight polymer, and an effective amount of bacteriostatic agent.

20 Claims, No Drawings

(56) References Cited

OTHER PUBLICATIONS

Koo, et al, Improvement of the Stability of *Lactobacillus casei* Yit 9018 by Microencapsulation using Alginate and Chitosan, Journal of Microbiology and Biotechnology, Korean Society for Applied Microbiology, 11(3), pp. 376-383, 2001. Abstract only.

Virga, et al., A Comparative Study in Vivo of the Therapeutic Effect of Triclosan, Hexetidine and Chitosan. Acta Odontologica Latinoamericana : AOL, 5(1-2), pp. 3-9, 2002. Abstract only.

Jenkins, et al., *Lactobacillus* Growth and Membrane Composition in the Presence of Linoleic or Conjugated Linoleic Acid, Canadian Journal of Microbiology, 49(1), pp. 51-57, 2003.

Xu, et al., Inhibition Study on Spoilage Microorganisms Separated from Beef Sliced Ham by Different Antimicrobials, Shipin Kexue (Beijing, China), 26(7), pp. 93-98, 2005. Abstract only.

Rokka, et al, Protecting Probiotic Bacteria by Microencaplulation: Challenges for Industrial Applications, European Food Research and technology, 231(1), pp. 1-12, 2010. Abstract only.

* cited by examiner

METHOD OF ENHANCING THE SHELF STABILITY OF PROBIOTICS

CROSS REFERENCE TO RELATED APPLICATIONS

This application is a 35 USC §371 national phase filing of PCT/US2011/050514 filed Sep. 6, 2011, which claims the benefit of U.S. Application No. 61/377,303, filed Aug. 26, 2010.

FIELD

The present invention relates to probiotics generally, and more specifically, to methods of stabilizing the same in foods and beverages.

BACKGROUND

Probiotics are live microorganisms, preferably bacteria, which when administered in adequate amounts to a subject, confer a health benefit to the subject. Some health benefits may be strain specific, i.e., vary by genus and species, but regardless of the type of benefit, to confer the benefit, an effective amount of bacteria must be alive (or viable) at the time of administration. As a result of this overriding concern in the art, considerable research has been done on strategies for dry shelf stability, as well as, enteric coatings to protect the probiotics as they pass through the subject's stomach. Stability is typically measured as a decrease in viable bacteria, for example, a log reduction in colony forming units (cfu) is a ten-fold decrease.

Regarding the concern related to shelf stability, following convention wisdom, those skilled in the art have concentrated their efforts on freeze drying the bacteria and then keeping them dry, usually by using a hydrophobic coating. Nonetheless, activity appears to decrease over time, even in dry environments. In environments where the moisture is about 10% water, activity drops precipitously. For example, US 2005/0266069, para. [0025] alleges a 4 log reduction in 14 days at 37° C. for one variety of encapsulated probiotic in a 10% water environment. Food is typically described as dry (theoretically 0-15% water), semi-moist (15-70% water), or moist (70-90%). Beverages are obviously greater than 90% water. As can be appreciated, if limited to dry environments, a large market segment remains closed to probiotics, or requires dosing with a vast excess of probiotics in the hope that an effective amount will survive.

Accordingly, what is needed are methods for enhancing the shelf stability of probiotics in foods that have greater than 10% water or in beverages.

DETAILED DESCRIPTION

In one embodiment, the present invention provides methods of providing a shelf-stable probiotic-containing food or beverage, comprising forming a semi-permeable microsphere comprising a probiotic, a high molecular weight polymer, and an effective amount of bacteriostatic agent, introducing the microsphere into the relatively high humidity food or beverage, wherein said relatively high humidity food has a residual moisture level greater than 10% water, and storing said food or beverage before consumption without refrigeration for at least 6 weeks.

In another embodiment, the present invention provides methods of providing a shelf-stable probiotic-containing food or beverage, comprising providing a semi-permeable microsphere comprising a probiotic, a high molecular weight polymer, and an effective amount of bacteriostatic agent, placing the microsphere into the relatively high humidity food or beverage, wherein said relatively high humidity food has a residual moisture level greater than 10% water, and allowing water to enter the microsphere, wherein the probiotic experiences a reduction in population of 1.5 log cfu or less after storing said food or beverage for at least 6 weeks without refrigeration.

"Shelf stable" means that the probiotic retains sufficient viability to confer its health benefit. Such amounts are known to those skilled in the art for each strain of probiotic. In a preferred embodiment, the probiotic experiences a reduction in population of less than 1.5 log cfu, preferably less than 1.3 log cfu, preferably less than 1.1 log cfu, preferably less than 1.0 log cfu, preferably less than 0.9 log cfu, preferably less than 0.8 log cfu.

Previously, those skilled in the art have considered it essential to keep the probiotic dry to maintain stability. Applicants have surprisingly found that good stability can be achieved using a semi-permeable microsphere, provided that an effective amount of bacteriostatic agent is included, as will be described. "Semi-permeable" refers to permeable to water. In one embodiment, the permeability varies by high molecular weight polymer.

The microsphere can be formed in a variety of conventional manners, such as by fluid bed agglomeration, gel bead formation, spray drying, or foam granulation. In one embodiment, conditions are controlled such that the microsphere has an average a particle size less than 500 microns. Typically, the probiotic is lyophilized and then either coated, dispersed, or otherwise entrained in the microsphere. In one embodiment, the microsphere has a multilayer composition. In one embodiment of the multilayer embodiment, the microsphere does not include a wax.

Examples of suitable probiotic micro-organisms include yeasts such as *Saccharomyces, Debaromyces, Candidaw Pichia* and *Torulopsis*, molds such as *Aspergillus, Rhizopus, Mucor, Torulopsis*, and *Penicillium* and bacteria such as the genera *Bifidobacterium, Bacteroides, Clostridium, Fusobacterium, Melissococcus, Propionibacterium, Streptococcus, Enterococcus, Lactococcus, Kocuriaw, Staphylococcus, Peptostrepococcus, Bacillus, Pediococcus, Micrococcus, Leuconostoc, Weissella, Aerococcus, Oenococcus* and *Lactobacillus*. Non-limiting examples of *Lactobacillus* include *L. acidophilus, L. alimentarius, L. amylovorus, L. crispatus, L. brevis, L. case4 L. curvatus, L. cellobiosus, L. delbrueckii ss. bulgaricus, L farciminis, L. fermentum, L. gasseri, L. helveticus, L. lactis, L. plantarum, L. johnsonii, L. reuteri, L. rhamnosus, L. sakei*, and *L. salivarius*.

Suitable probiotics may be obtained from Jarrow Formulas, for example, *Lactobacillus plantarum* 299v (active ingredient of Ideal Bowel Support™ 299v; 10 billion live organisms) or Custom Probiotics, for example *L. plantarum, L. rhamnosus*, or *L. acidophilus*.

"High molecular weight polymer" greater than weight average molecular weight of 50,000. A number of synthetic, natural, or modified, polymers are contemplated, including keratin, casein, albumin, collagen, glutelin, glucagon, gluten, zein, gelatins and derivatives thereof, polymers derived from chitin or from chitosan, polysaccharide polymers such as cellulose-based polymers, for instance ethylcellulose, hydroxyethylcellulose, hydroxypropylcellulose, hydroxypropylmethylcellulose, methylcellulose, ethylhydroxyethylcellulose, carboxymethylcellulose and quaternized cellulose derivatives, starches and derivatives thereof, acrylic polymers or copolymers such as polyacrylates, polymethacrylates and copolymers thereof, polyvinyl alcohols, polymers of natural origin, which are optionally derivatized, such as gum arabic, guar gum, xanthan derivatives or karaya gum, alginates, carrageenans, ulvanes and other algal colloids, glycoaminoglycans, hyaluronic acid and its derivatives, shellac, sandarac gum, dammar resins, elemi gums and copal resins, deoxyribonucleic acid, mucopolysaccharides such as hyaluronic acid, chondroitin sulphate, caprolactams, pullulan, pectin, mannan and galactomannans, and glucomannans, and mixtures and/or derivatives thereof. Notwithstanding the foregoing exemplary list, it is understood that a number of food grade high molecular weight polymers are contemplated.

Non-limiting examples of preferred high molecular weight polymer include ethylcellulose and alginate. Optionally, two or more high molecular weight polymers may be blended.

Not wishing to be bound by theory, the bacteriostatic agent appears to be a critical feature of the semi-permeable microsphere. As will be shown in the accompanying examples, both too little and too much bacteriostatic agent results in a loss of viability. The bacteriostatic agent may be selected from nisin, decanoic acid, lauric acid, chitosan, sodium benzoate, fumaric acid, potassium sorbate, PABA, propionic acid, TRI-CLOSAN, and linoleic acid.

In one embodiment, the bacteriostatic agent is lauric acid. When the bacteriostatic agent is lauric acid, it is preferably present in a wt. % range (relative to the total weight of the microsphere) from about 0.3 to about 15, preferably from about 0.3 to about 12, preferably from about 0.4 to about 11, preferably from about 0.5 to about 10. Further subcombinations within the ranges are contemplated.

Microspheres of the present invention are useful in stabilizing probiotics to provide longer shelf lives when incorporated in a food or beverage. Particularly preferred are situations where the microsphere is in a relatively high humidity food that has a residual moisture level greater than 20% water, preferably greater than 30% water, preferably greater than 40% water, more preferably greater than 50% water.

Water activity refers to (the partial pressure of water vapor at the surface of the product at a given temperature) divided by (the saturation pressure of the partial pressure of water vapor above pure water at the same temperature). In the food art, water activity of ≥0.3 to ≤0.5 is considered semi-dry, >0.5 to ≤0.7 is considered semi-moist, and >0.7 or above is considered moist. In the past, semi-moist and moist foods that contain probiotics were thought to require refrigeration.

In one embodiment, the microsphere is in a relatively high humidity food that has a water activity greater than 0.6, preferably greater than 0.7, preferably greater than 0.8 water, more preferably greater than 0.9.

In one embodiment, the relatively high humidity food includes pet food, snack foods, health bars, and non-cooked pre-packaged mixes, such as powdered milk.

In one embodiment, the microsphere is in a beverage. For reference, the water activity of most beverages is 1.0. In one embodiment, the beverage has a pH less than 5. Examples of such beverages include fruit juices and soft drinks (sodas).

EXAMPLES

The following examples are for illustrative purposes only and are not intended to limit the scope of the present invention. All percentages are by weight unless otherwise specified.

Example 1

Exemplary microspheres of the present invention were formed by covering lyophilized *L. rhamnosus* from Custom Probiotics Inc (100 g starting weight) with a stabilizing material comprising 3.33% ETHOCEL ethylcellulose, available from The Dow Chemical Company Midland Mich. (ethoxyl content of 48.0%-49.5% and a solution viscosity measured in a 5% (80:20 toluene:ethanol) solution, with an Ubbelohde viscometer at 25° C. of 12.6-15.4 cP) and lauric acid. The lauric acid and ethylcellulose were dispersed in a solvent blend of 80% ethyl acetate/20% ethanol to form a stabilizing solution.

The stabilizing solution was applied to the bacteria via a fluidized bed coater using the Wurster process. The Wurster process is characterized by the location of a spray nozzle at the bottom of a fluidized bed of solid particles suspended in a fluidized bed coater chamber via a nitrogen stream. The particles follow a cyclic flow on top of the spray nozzle. The nozzle sprays an atomized flow of stabilizing solution on the particles, which creates a uniform microsphere. The set temperature was 80° C., which resulted in a chamber temperature of about 55° C. Flow rate was 0.6 g/min. Process pressure was 0.8 bar. Nozzle pressure was 1.8 bar. The process yields uniform spherical particles with a particle size average in the 500 micron range, as determined via optical microscopy.

The resulting amounts of lauric acid contained in the microspheres were estimated based on the amount of bacteria that was recuperated at the end of each fluidized bed coated runs, as well as the total amount of stabilizing solution that was injected in the chamber during each run. Compositions of the microspheres were calculated and are given in wt. % range (relative to the total weight of the microsphere) in TABLE 1:

TABLE 1

| Batch | Probiotic | Polymer | Lauric Acid |
|---|---|---|---|
| A | 61.92 | 29.28 | 8.79 |
| B | 75.99 | 18.46 | 5.54 |

Example 2

Exemplary microspheres of the present invention were formed by spray drying probiotic containing powders (Batch D was 5.4 g *L. Plantarum* 299v plus nonactive ingredients, procured from Jarrow Formulas by breaking open capsules of Ideal Bowel Support™ 299v (active ingredient *L. Plantarum* 299v; 10 billion live organisms per capsule), Batch E was 7.3 g *L. Plantarum*, procured from Custom Probiotics) with 0.27 g lauric acid and coconut oil (C=21.33 g (39.5%); D=19.43 g (36%). Lauric acid and oil were melted together and mixed with probiotic at elevated temperature (40-45° C.). The spray drying formulation was prepared by dispersing 27 g of this mixture into 100 g SURELEASE (ETHOCEL ethylcellulose dispersion (27% solid)), and additional sterilized water was added to tune the viscosity. The dispersion mixture was pumped to a two-fluid nozzle atomizer equipped on a Mobile Minor spray dryer. The air pressure to the nozzle was fixed at 1 bar with 50% flow which is equivalent to 6 kg/hr of airflow. The spray drying was conducted in a nitrogen environment with an inlet temperature fixed at 140° C., and the outlet temperature was targeted to 50° C.±1° C. by tuning the feed rate of the mixture. Microspheres were collected using a cyclone, and then vacuumed to remove residue moisture. Compositions of the microspheres were calculated and are given in wt. % range (relative to the total weight of the microsphere) in TABLE 2:

TABLE 2

| Batch | Probiotic | Polymer | Lauric Acid |
|-------|-----------|---------|-------------|
| C | 10.0 | 50.0 | 0.5 |
| D | 13.5 | 50.0 | 0.5 |

The resulting particle size of the powder has a mean particle size diameter of 43 microns as determined by a Coulter Counter technique.

Example 3

Exemplary microspheres of the present invention were formed by gel beading. Mixtures of coconut oil (respectively, 2.85 g, 1.5 g, 0.75 g, and 0 by batch) and lauric acid were blended and melted at 55° C. Each resulting melt was mixed with a bacteria powder (*L. plantarum* 299v, from Jarrow Formulas by breaking open capsules of Ideal Bowel Support™ 299v (active ingredient *L. Plantarum* 299v; 10 billion live organisms per capsule) (Batches E and F using 0.25 g of contents, Batches G and H using 0.20 g of contents).

The melt/bacteria powders were then each dispersed in 10.9375 g of a 2% solution of sodium alginate (KELTONE LV, FMC biopolymer, Mw=50000-75000 Da). Drops of each batch were then pipetted into a separate 1M calcium chloride solution to cross link the sodium alginate and form alginate based gel bead microspheres, which were immediately transferred into deionized water.

Compositions of the microspheres were calculated and are given in wt. % range (relative to the total weight of the microsphere) in TABLE 3:

TABLE 3

| Batch | Probiotic | Polymer | Lauric Acid | Coconut Oil |
|-------|-----------|---------|-------------|-------------|
| E | 1.76 | 1.54 | 1.06 | 20.09 |
| F | 1.76 | 1.55 | 10.57 | 10.57 |
| G | 1.41 | 1.56 | 15.92 | 5.31 |
| H | 1.41 | 1.56 | 21.22 | 0 |

The balance of the microspheres are water (percentages determined relatively soon after formation). The resulting particle size of the microsphere is ≥1000 microns as determined by optical microscopy, but could be made smaller by micropipette or other conventional techniques.

Example 4 (Comparative)

Comparative microspheres were formed substantially by the process of Example 2, but omitting lauric acid and using 21.6 g coconut oil, hereinafter referred to as Comparative Batch 1.

Example 5 (Comparative)

Comparative microspheres were formed substantially by the process of Example 3, but omitting lauric acid, and using 0.25 g probiotic powder contents and 3.0 g coconut oil, hereinafter referred to as Comparative Batch 2.

Example 6

Method

Initial cell count viability was assessed by suspending 100 mg of microspheres in 1 ml of water and processed using one of the following methods to release the bacteria: 1) Soak sample overnight at 37° C. and vortex mix vigorously to release the bacteria; 2) Chop the particles with a sterile razor blade after overnight soaking at 37° C.; 3) Grind the sample using a mortar and pestle. As can be appreciated, for the uncoated control, the samples were not soaked overnight in water as there was no need for release of bacteria. Similarly, the testing of viability of materials that were already soaking in water for stability testing also did not require additional soaking overnight. After processing, 4 ml of MRS broth media was added to the released bacterial suspension. Serial dilutions were then made and 100 μl was plated on MRS agar and incubated at 37° C. for 24-36 hours. Bacterial colonies were counted and viable cell populations were reported per gram of microspheres.

Microspheres were made substantially according to Example 1 are tested for their viability after soaking in distilled water for the stated periods, as described in TABLE 4A:

TABLE 4A

| Batch | Initial Viability (cfu/g) | 4 weeks cfu/g | 4 weeks log loss | 6 weeks cfu/g | 6 weeks log loss |
|-------|--------|--------|--------|--------|--------|
| Batch A | 2.70E+10 | 1.50E+10 | 0.26 | 3.20E+9 | 0.92 |
| Batch B | 1.00E+10 | 2.10E+9 | 0.67 | 9.3E+8 | 1.03 |
| Comparative Uncoated *L. rhamnosus* | 2.40E+11 | 2.80E+9 | 1.9 | 1.9E+9 | 2.1 |

Microspheres were made substantially according to Examples 2 and 4 are tested for their viability after soaking in distilled water for the stated periods. Results are given in TABLE 4B:

TABLE 4B

| Batch | Initial Viability (cfu/g) | 4 weeks cfu/g | 4 weeks log loss | 6 weeks cfu/g | 6 weeks log loss |
|-------|--------|--------|--------|--------|--------|
| Batch C | 7.70E+9 | 3.30E+8 | 1.36 | 5.50E+8 | 1.14 |
| Batch D | 4.00E+10 | 2.40E+9 | 1.22 | 3.00E+9 | 1.12 |
| Comparative Batch 1 | 3.4E+10 | 1.20E+9 | 1.45 | 2.50E+7 | 3.13 |
| Comparative Uncoated *L. plantarum* 299v | 3.50E+10 | 2.20E+9 | 1.2 | 2.50E+8 | 3.23 |
| Comparative Uncoated *L. plantarum* | 1.33E+11 | 1.50E+10 | 0.94 | 4.20E+8 | 2.5 |

Microspheres were made substantially according to Examples 3 and 5 are tested for their viability after soaking in distilled water for the stated periods. Results are given in TABLE 4C:

TABLE 4C

| Batch | Initial Viability (cfu/g) | 4 weeks | | 5 weeks | | 7 weeks | |
|---|---|---|---|---|---|---|---|
| | | cfu/g | log loss | cfu/g | log loss | cfu/g | log loss |
| Batch E | 1.41E+10 | 3.96E+9 | 0.55 | — | — | 9.96E+8 | 1.15 |
| Batch F | 3.79E+9 | 6.16E+9 | 0 | — | — | 1.77E+9 | 0.33 |
| Batch G | ** | ** | ** | ** | ** | ** | ** |
| Batch H | ** | ** | ** | ** | ** | ** | ** |
| Comparative Batch 2 | 1.33E+10 | — | — | 1.40E+6 | 3.98 | 6.95E+6 | 3.28 |

** bactericidal

Example 7 (Comparative)

Microspheres were made substantially according to Example 4 and tested for their water uptake against unencapsulated *L. rhamnosus* probiotic. Both samples were held in a humidity chamber at ~30% relative humidity until samples reached equilibrium mass. The % mass change indicates the amount of water picked up by the samples. Both samples had a 30.4% change in mass. The results confirm that even hydrophobic encapsulation does not prevent water uptake.

It is understood that the present invention is not limited to the embodiments specifically disclosed and exemplified herein. Various modifications of the invention will be apparent to those skilled in the art. Such changes and modifications may be made without departing from the scope of the appended claims.

Moreover, each recited range includes all combinations and subcombinations of ranges, as well as specific numerals contained therein. Additionally, the disclosures of each patent, patent application, and publication cited or described in this specification are hereby incorporated by reference herein, in their entireties.

The invention claimed is:

1. A method of producing a shelf-stable probiotic-containing food or beverage, comprising:
   forming a semi-permeable microsphere comprising a probiotic, a high molecular weight polymer, and an effective amount of bacteriostatic agent,
   introducing the microsphere into a relatively high humidity food or beverage, wherein said relatively high humidity food has a residual moisture level greater than 10% water, and
   storing said food or beverage before consumption without refrigeration for at least 6 weeks.

2. The method of claim 1, wherein the probiotic experiences a reduction in population of 1 log cfu or less.

3. The method of claim 1, wherein the high molecular weight polymer is ethylcellulose.

4. The method of claim 1, wherein the high molecular weight polymer is alginate.

5. The method of claim 1, wherein the microsphere is in a beverage.

6. The method of claim 5, wherein the beverage has a pH less than 5.

7. The method of claim 1, wherein the microsphere is in a relatively high humidity food that has a residual moisture level greater than 20% water.

8. The method of claim 1, wherein the microsphere is in a relatively high humidity food that has a water activity greater than 0.6.

9. The method of claim 1, wherein the relatively high humidity food includes pet food, snack foods, health bars, and non-cooked pre-packaged mixes.

10. The method of claim 1, wherein the microsphere has a multilayer composition, provided the microsphere does not include a wax.

11. The method of claim 1, wherein the microsphere has a particle size less than 500 microns.

12. A method of producing a shelf-stable probiotic-containing food or beverage, comprising:
   producing a semi-permeable microsphere comprising a probiotic, a high molecular weight polymer, and an effective amount of bacteriostatic agent,
   placing the microsphere into a relatively high humidity food or beverage, wherein said relatively high humidity food has a residual moisture level greater than 10% water, and
   allowing water to enter the microsphere, wherein the probiotic experiences a reduction in population of 1.5 log cfu or less after storing said food or beverage for at least 6 weeks without refrigeration.

13. The method of claim 1, wherein the the quantity of bacteriostatic agent is effective to yield a reduction in probiotic population of less than 1.5 log cfu between initial viability and viability after storing said food or beverage for at least 6 weeks without refrigeration.

14. The method of claim 1 wherein the quantity of probiotic is about 1.76 to 75.99 weight percent, the quantity of polymer is about 1.54-50 weight percent, and the quantity of bacteriostatic agent is about 0.5 to 10.57 percent, based on the total weight of the semi-permeable microsphere.

15. The method of claim 14 wherein the bacteriostatic agent is lauric acid, the polymer is ethylcellulose or alginate; and the probiotic is a *Lactobacillus*.

16. The method of claim 1, wherein the bacteriostatic agent is lauric acid in an amount of about 0.4 to about 12 wt. %, relative to the total weight of the microsphere.

17. The method of claim 12, wherein the quantity of bacteriostatic agent is effective to yield a reduction in probiotic population of less than 1.5 log cfu between initial viability and viability after storing said food or beverage for at least 6 weeks without refrigeration.

18. The method of claim 12 wherein the quantity of probiotic is about 1.76 to 75.99 weight percent, the quantity of polymer is about 1.54-50 weight percent, and the quantity of bacteriostatic agent is about 0.5 to 10.57 percent, based on the total weight of the semi-permeable microsphere.

19. The method of claim 18 wherein the bacteriostatic agent is lauric acid, the polymer is ethylcellulose or alginate; and the probiotic is a *Lactobacillus*.

20. The method of claim 12, wherein the bacteriostatic agent is lauric acid in an amount of about 0.4 to about 12 wt. %, relative to the total weight of the microsphere.

* * * * *